US011063252B2

(12) United States Patent
Oh

(10) Patent No.: US 11,063,252 B2
(45) Date of Patent: Jul. 13, 2021

(54) POSITIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventor: Eun-Ok Oh, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 105 days.

(21) Appl. No.: 15/453,859

(22) Filed: Mar. 8, 2017

(65) Prior Publication Data
US 2017/0271655 A1 Sep. 21, 2017

(30) Foreign Application Priority Data
Mar. 15, 2016 (KR) .................. 10-2016-0030891

(51) Int. Cl.
H01M 4/36 (2006.01)
H01M 4/1391 (2010.01)
H01M 4/62 (2006.01)
H01M 4/131 (2010.01)
H01M 4/04 (2006.01)
(Continued)

(52) U.S. Cl.
CPC ......... H01M 4/366 (2013.01); H01M 4/0471 (2013.01); H01M 4/131 (2013.01);
(Continued)

(58) Field of Classification Search
CPC ............ H01M 4/366; H01M 10/0525; H01M 4/0471; H01M 4/525; H01M 4/5825; H01M 2004/021
(Continued)

(56) References Cited

U.S. PATENT DOCUMENTS 5,702,995 A * 12/1997 Fu .................. C03C 10/00
501/10
2004/0081888 A1* 4/2004 Thakeray ........... C01G 23/002
429/231.1
(Continued)

FOREIGN PATENT DOCUMENTS

JP 2008-226463 A 9/2008
KR 10-0814881 B1 3/2008
(Continued)

OTHER PUBLICATIONS

Morimoto et al., "Preparation of lithium ion conducting solid electrolyte of NASICON-type $Li_{1+x}Al_xTi_{2-x}(PO_4)_3$ (x=0.3) obtained by using the mechanochemical method and its application as surface modification materials of $LiCoO_2$ cathode for lithium cell", Journal of Power Sources, May 18, 2013, pp. 636-643, vol. 240.

Primary Examiner — Jonathan G Jelsma
Assistant Examiner — Omar M Kekia
(74) Attorney, Agent, or Firm — Lewis Roca Rothgerber Christie LLP

(57) ABSTRACT

A positive active material including a core including a lithium intercalation compound and a coating compound on a surface of the core, the coating compound including $Li_2MO_3$ and a solid electrolyte compound represented by Chemical Formula 1 $[Li_{1.3+4x}Al_{0.3}M_{1.7-x}(PO_4)_3]$, wherein 0≤x≤0.7, and M is an element selected from Ti, Cr, Ga, Fe, Sc, In, Y, La, Mg, Sr, and combinations thereof; and a rechargeable lithium battery includes the positive active material.

8 Claims, 14 Drawing Sheets

(51) Int. Cl.
  *H01M 4/525* (2010.01)
  *H01M 4/58* (2010.01)
  *H01M 10/0525* (2010.01)
  H01M 10/052 (2010.01)
  H01M 4/02 (2006.01)

(52) U.S. Cl.
  CPC ......... *H01M 4/1391* (2013.01); *H01M 4/525* (2013.01); *H01M 4/5825* (2013.01); *H01M 4/62* (2013.01); *H01M 10/0525* (2013.01); H01M 10/052 (2013.01); H01M 2004/021 (2013.01); H01M 2004/028 (2013.01)

(58) Field of Classification Search
  USPC ...................................... 429/231.3
  See application file for complete search history.

(56) References Cited

U.S. PATENT DOCUMENTS

| | | |
|---|---|---|
| 2008/0124630 A1 | 5/2008 | Kim et al. |
| 2008/0311480 A1* | 12/2008 | Sano ............... H01M 4/13 429/322 |
| 2010/0028776 A1* | 2/2010 | Park ............... H01M 4/366 429/221 |
| 2012/0104334 A1 | 5/2012 | Lee et al. |
| 2012/0231322 A1* | 9/2012 | Chu ............... H01M 2/1653 429/144 |
| 2014/0087256 A1* | 3/2014 | Li ............... H01M 4/366 429/220 |
| 2014/0322607 A1* | 10/2014 | Thackeray ........... H01M 4/366 429/223 |
| 2016/0043388 A1 | 2/2016 | Oh |
| 2016/0204467 A1* | 7/2016 | Nogami ............... H01M 4/62 429/322 |

FOREIGN PATENT DOCUMENTS

| | | |
|---|---|---|
| KR | 10-2010-0004025 A | 1/2010 |
| KR | 10-2012-0046612 A | 5/2012 |
| KR | 10-2016-0019327 A | 2/2016 |

* cited by examiner

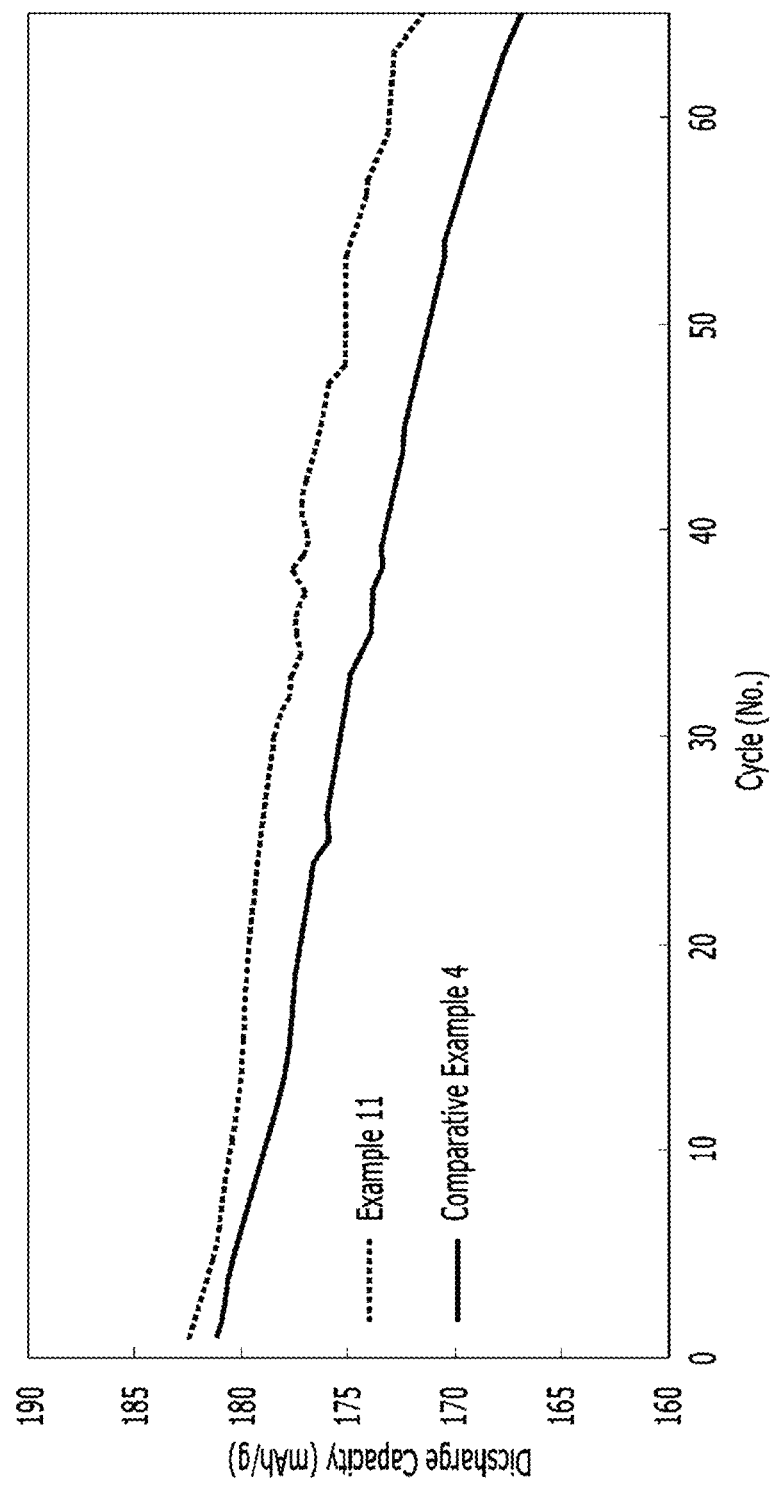

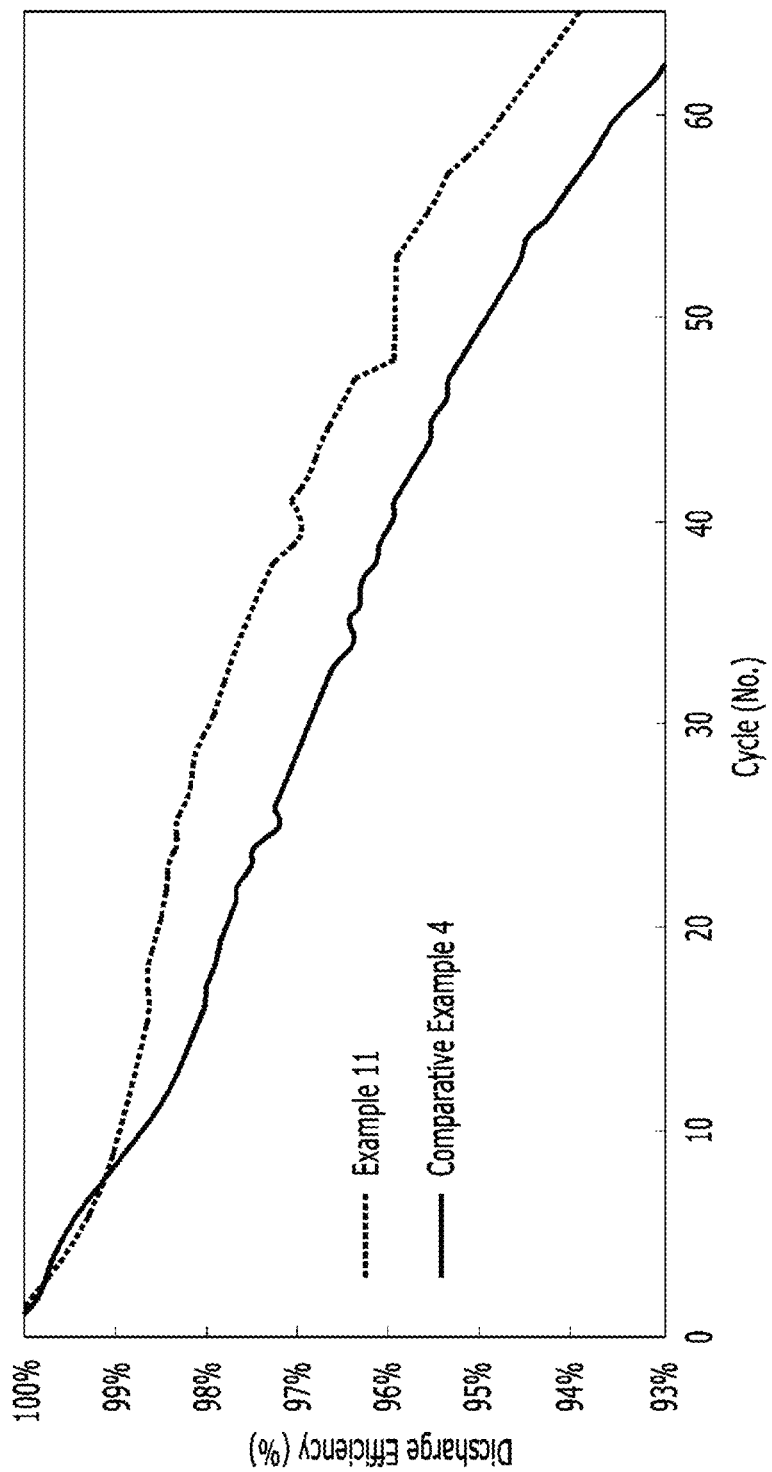

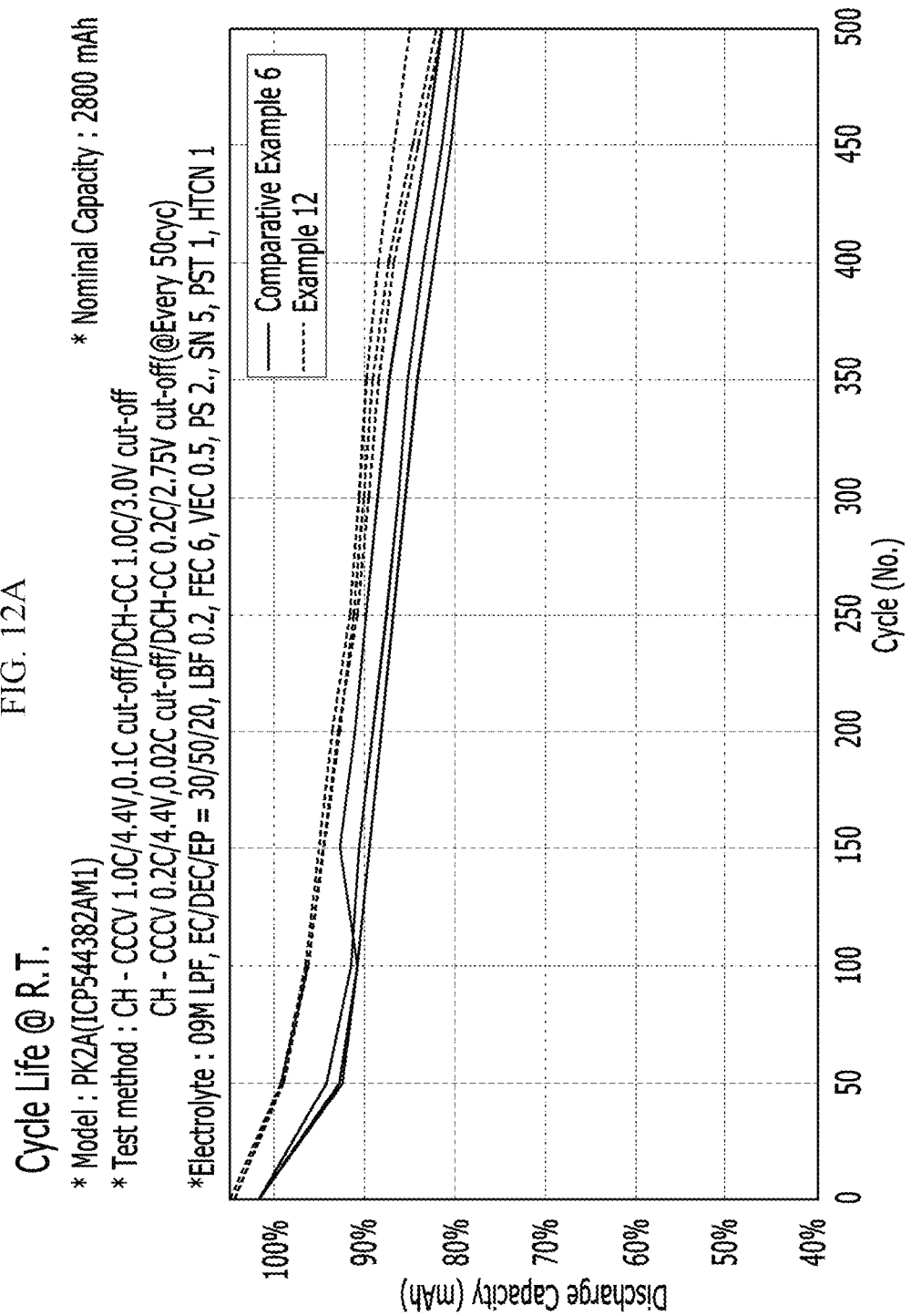

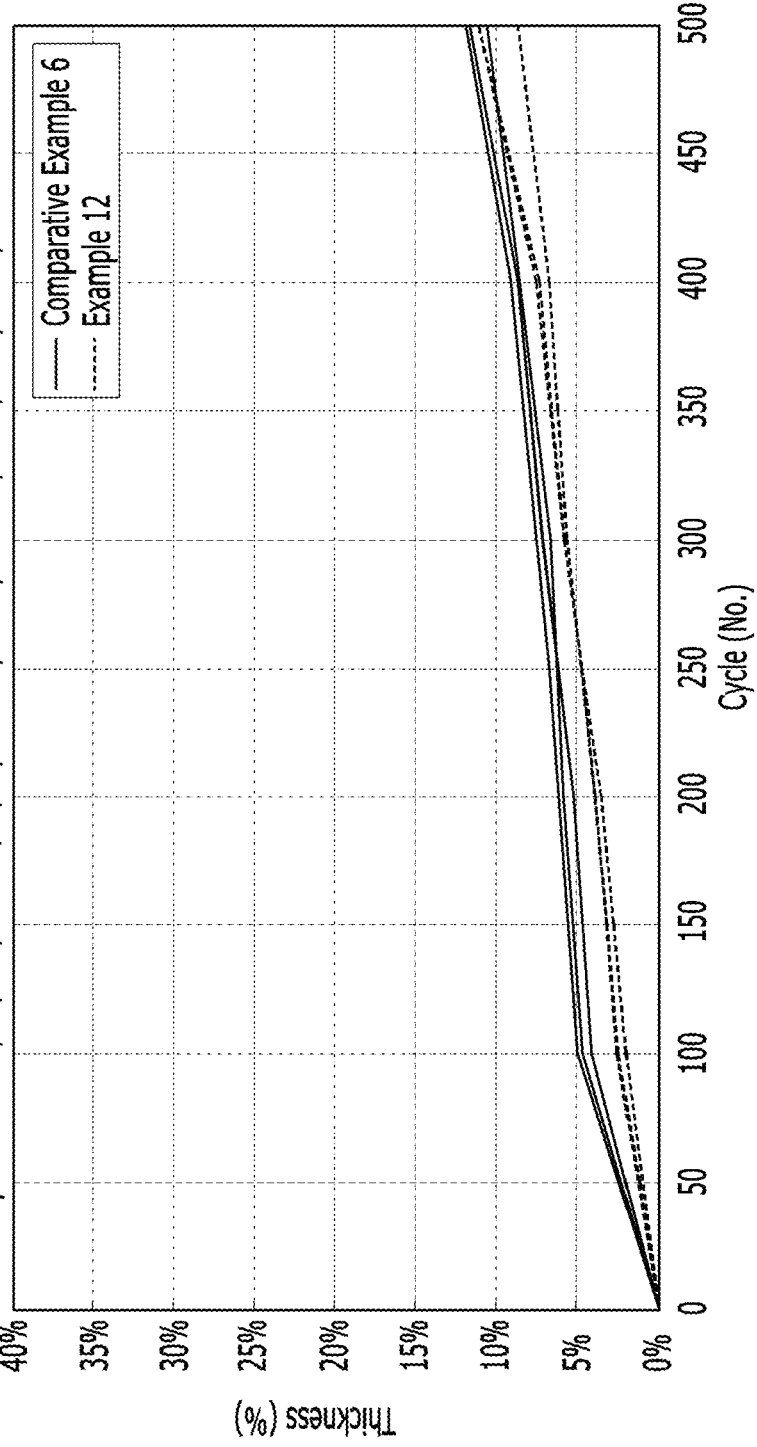

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2016-0030891 filed in the Korean Intellectual Property Office on Mar. 15, 2016, the entire content of which is incorporated herein by reference.

BACKGROUND

1. Field

One or more aspects of example embodiments of the present disclosure are related to a positive active material for a rechargeable lithium battery and a rechargeable lithium battery including the same.

2. Description of the Related Art

Lithium rechargeable batteries have recently drawn attention as power sources for small portable electronic devices. Lithium rechargeable batteries using organic electrolyte solutions may have discharge voltages that are at least twice as high as those of alkaline batteries using alkali aqueous electrolyte solutions, and accordingly, may have higher energy densities.

Lithium-transition metal oxides having structures capable of intercalating lithium ions (such as $LiCoO_2$, $LiMn_2O_4$, $LiNi_{1-x}Co_xO_2$ (0<x<1), and/or the like) have been used as positive active materials in rechargeable lithium batteries.

One or more suitable carbon-based materials (such as artificial graphite, natural graphite, and/or hard carbon) and oxides (such as tin oxide, lithium vanadium-based oxide, and/or the like), which intercalate and deintercalate lithium ions, have been used as negative active materials.

SUMMARY

One or more aspects of example embodiments of the present disclosure are directed toward a positive active material for a rechargeable lithium battery having high active mass density and improved cycle-life.

One or more aspects of example embodiments of the present disclosure are directed toward a rechargeable lithium battery including the positive active material.

One or more example embodiments of the present disclosure provide a positive active material for a rechargeable lithium battery including a core including a lithium intercalation compound and a coating compound on a surface of the core, the coating compound including $Li_2MO_3$ and a solid electrolyte compound represented by Chemical Formula 1 (wherein M is an element selected from titanium (Ti), chromium (Cr), gallium (Ga), iron (Fe), scandium (Sc), indium (In), yttrium (Y), lanthanum (La), magnesium (Mg), strontium (Sr), and combinations thereof):

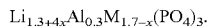
[Chemical Formula 1]

In Chemical Formula 1,
0≤x≤0.7, and
M may be an element selected from Ti, Cr, Ga, Fe, Sc, In, Y, La, Mg, Sr, and combinations thereof.

The coating compound may be present in a layered phase (e.g., as a layer) on the surface of the core.

The core may further include $Li_2MO_3$ (wherein M may be an element selected from Ti, Cr, Ga, Fe, Sc, In, Y, La, Mg, Sr, and combinations thereof).

An amount of the coating compound may be about 0.1 wt % to about 10 wt % based on 100 wt % of the positive active material.

A specific surface area of the positive active material may be about 0.1 m²/g to about 0.3 m²/g.

The positive active material may be prepared by mixing a lithium-containing compound, an aluminum-containing compound, an M-containing compound, a phosphate salt, a stabilizer, and a solvent to prepare a mixed solution; adding a lithium intercalation compound to the mixed solution to obtain a mixture; and drying and sintering the mixture.

The stabilizer may be acetic acid, acetylacetone, oxalic acid, citric acid, or a combination thereof.

Another example embodiment of the present disclosure provides a rechargeable lithium battery including a positive electrode including the positive active material; a negative electrode including a negative active material; and an electrolyte.

Other embodiments are included in the following detailed description.

A positive active material for a rechargeable lithium battery according to an embodiment of the present disclosure may have high active mass density and improved or increased cycle-life characteristics.

BRIEF DESCRIPTION OF THE DRAWINGS

FIG. 9 is a graph showing the room temperature cycle-life characteristics (e.g., discharge capacity over 65 cycles at 25° C.) of the half-cells according to Example 11 and Comparative Example 4.

FIG. 10 is a graph showing the room temperature discharge efficiencies (e.g., change in discharge efficiency over 65 cycles at 25° C.) of the half-cells according to Example 11 and Comparative Example 4.

FIG. 12A is a graph showing discharge capacity retention over 500 cycles, calculated using the discharge capacity values shown in FIG. 11A.

FIG. 12B is a graph showing the rate of thickness increase over 500 cycles, calculated using the thickness change values shown in FIG. 11B.

DETAILED DESCRIPTION

Figure 1:
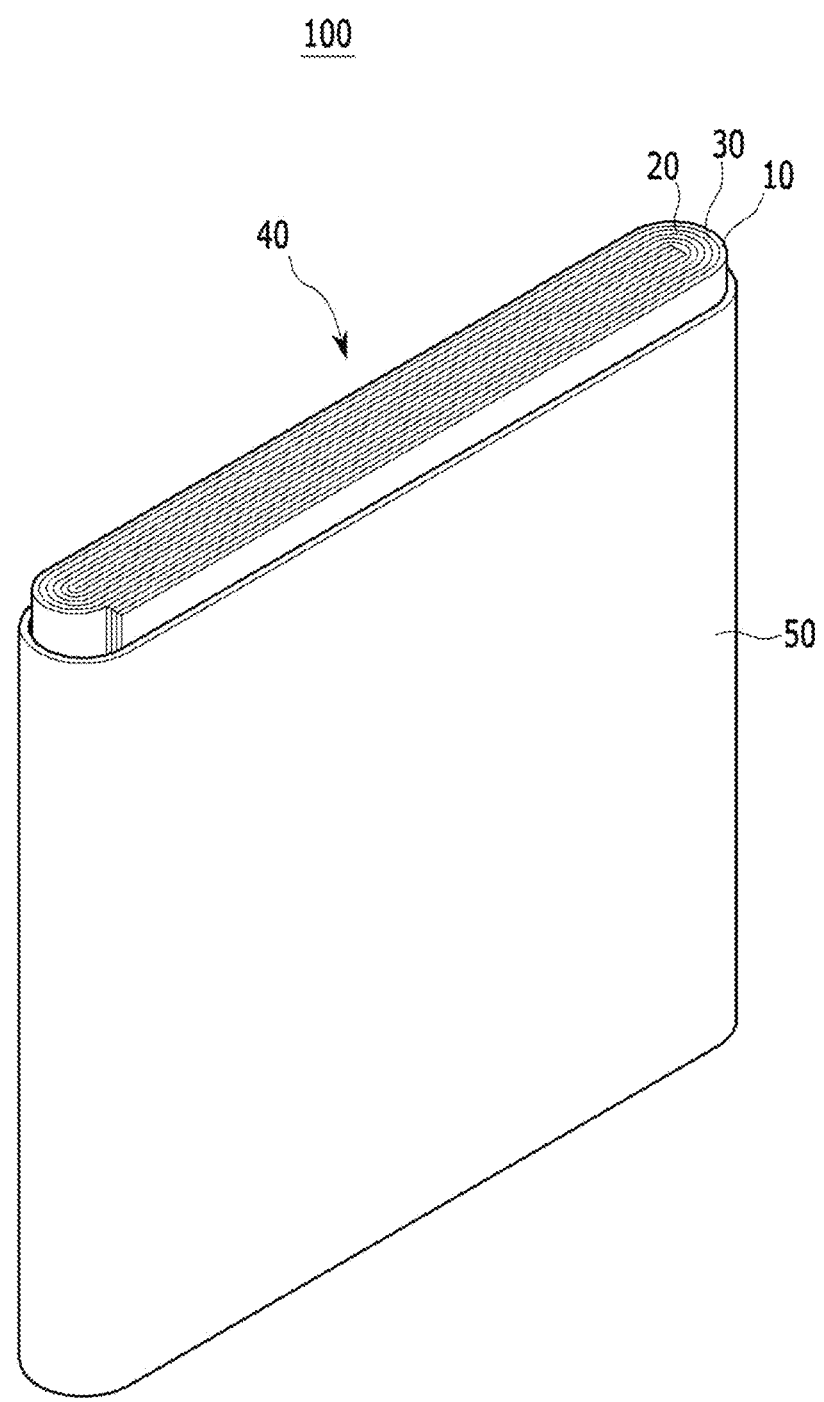
FIG. 1 is a schematic view showing the structure of a rechargeable lithium battery according to an embodiment of the present disclosure.

Hereinafter, embodiments of the present disclosure will be described in more detail with reference to the accompanying drawings. However, embodiments of this disclosure are not limited thereto.

In the drawings, the thicknesses of layers, films, panels, regions, etc., may be exaggerated for clarity. Like reference numerals designate like elements throughout the specification, and duplicative descriptions thereof may not be provided. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

A positive active material for a rechargeable lithium battery according to an embodiment of the present disclosure may include a core (e.g., particle core or center) including a lithium intercalation compound and a coating compound on a surface of the core, the coating compound including $Li_2MO_3$ and a solid electrolyte compound represented by Chemical Formula 1 (wherein M is an element selected from titanium (Ti), chromium (Cr), gallium (Ga), iron (Fe), scandium (Sc), indium (In), yttrium (Y), lanthanum (La), magnesium (Mg), strontium (Sr), and combinations thereof):

$$Li_{1.3+4x}Al_{0.3}M_{1.7-x}(PO_4)_3.$$ [Chemical Formula 1]

In Chemical Formula 1, $0 \leq x \leq 0.7$, and in some embodiments, $0 < x \leq 0.7$.

M may be an element selected from Ti, Cr, Ga, Fe, Sc, In, Y, La, Mg, Sr, and combinations thereof.

The solid electrolyte compound represented by Chemical Formula 1 may be a NASICON (e.g., sodium (Na) Super Ionic CONductor) compound having excellent ion conductivity, and may thus improve the charge and discharge efficiency and cycle-life characteristics of the positive active material. The solid electrolyte compound represented by Chemical Formula 1 according to an embodiment of the present disclosure has 1.3+4x moles of Li relative to each mole of material and thus includes an excessive or relatively large amount of Li, and may thereby show excellent ion conductivity compared with a solid electrolyte compound having less than 1.3+4x moles of Li relative to moles of material, and may therefore impart appropriate or suitable ion conductivity to the positive active material.

The solid electrolyte compound has 0.3 moles of Al relative to each mole of material, and may thus exhibit the most excellent (e.g., unexpectedly higher) Li ion conductivity compared to similar compounds having less than 0.3 moles or greater than 0.3 moles of Al.

The coating compound may be present in a layered phase (e.g., as a layer) on the surface of the core. In other words, the coating compound may continuously (e.g., completely or substantially) cover the surface of the core, and may be present as a coating layer. In this way, the coating compound may continuously cover the surface of the core, provide the positive active material with a uniform (e.g., substantially uniform) surface, and improve (e.g., increase) the active mass density of a positive electrode, thereby having a relatively high effect despite the use of a small amount of coating material. and increasing the amount of the positive active material in a positive electrode while retaining the same volume. Accordingly, the coating compound may reduce the cost of manufacturing the positive active material to be used in manufacturing the rechargeable lithium battery, and may increase the reaction area of the positive active material involved in electrochemical reactions.

In some embodiments, when the positive active material has a uniform (e.g., substantially uniform) surface, the packing density and thus the loading level of a positive electrode may be improved or increased, and accordingly, the cycle-life characteristics of the rechargeable lithium battery may be improved.

The mixing ratio (e.g., relative amounts) of the solid electrolyte compound and the $Li_2MO_3$ may be about 100:0.1 wt % to about 100:3 wt %. When the solid electrolyte compound and the $Li_2MO_3$ are mixed within this range, the lithium ion conductivity may be further improved.

An amount of the coating compound may be about 0.1 wt % to about 10 wt % based on 100 wt % of the positive active material. When the coating compound is included at an amount of less than about 0.1 wt %, ion conductivity may be decreased, and side reactions of the core material with an electrolyte solution may also be suppressed or reduced. When the coating compound is included in an amount of greater than about 10 wt %, the electrochemically reactive area of the positive active material may be reduced and thus the electrochemical performance (e.g., capacity) may be deteriorated.

The core may further include $Li_2MO_3$ (wherein M is an element selected from Ti, Cr, Ga, Fe, Sc, In, Y, La, Mg, Sr, and combinations thereof). The $Li_2MO_3$ component of the coating compound may diffuse inside of the core and be included therein during a process of manufacturing the positive active material. Accordingly, the amount of $Li_2MO_3$ included in the core is not particularly limited.

The positive active material may have a specific surface area of about 0.1 $m^2/g$ to about 0.3 $m^2/g$. When the positive active material has a specific surface area within this range, electrochemical performance metrics (such as capacity, cycle-life characteristics, and/or the like) may be further improved, and side reactions of the core material with an electrolyte may be effectively suppressed or reduced.

The lithium intercalation compound may be represented by at least one of the following chemical formulae:

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_{b-}$ $Co_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001 b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{3-f}J_2(PO_4)_3$ (0≤f≤2); $Li_{3-f}Fe_2(PO_4)_3$ (0≤f≤2); and $Li_aFePO_4$ (0.90≤a≤1.8)

In the chemical formulae, A may be selected from nickel (Ni), cobalt (Co), manganese (Mn), and combinations thereof; M may be selected from magnesium (Mg), lanthanum (La), terbium (Tb), gadolinium (Gd), cerium (Ce), praseodymium (Pr), neodymium (Nd), samarium (Sm), barium (Ba), strontium (Sr), calcium (Ca), and combinations thereof; D may be selected from oxygen (O), fluorine (F), sulfur (S), phosphorus (P), and combinations thereof; E may be selected from Co, Mn, and combinations thereof; and T may be selected from F, S, P, and combinations thereof.

The positive active material may be prepared using a liquid phase method using a stabilizer (chelating agent) in a solvent. For example, the positive active material may be prepared by mixing a lithium-containing compound, an aluminum-containing compound, an M-containing compound, a phosphate salt, a stabilizer, and a solvent to thereby prepare a mixed solution; adding a lithium intercalation compound to the mixed solution to thereby obtain a mixture; and drying and sintering the mixture.

Hereinafter, a method of preparing a positive active material is described in more detail.

First, a lithium-containing compound, an aluminum-containing compound, an M-containing compound (wherein M is an element selected from Ti, Cr, Ga, Fe, Sc, In, Y, La, Mg, Sr, and combinations thereof), a phosphate salt, a stabilizer, and a solvent are mixed to thereby prepare a mixed solution. In other words, this manufacturing method uses a liquid state reaction using a solvent, which may employ heat treatment at a low temperature and may be simpler than a solid state reaction.

In some embodiments, the manufacturing method uses a stabilizer that may thereby improve the solubility of starting materials, control low temperature crystalline growth, and improve the stability and reproducibility (e.g., of material performance characteristics) of a rechargeable lithium battery. Furthermore, the stabilizer may have a gelation-delaying effect, and may thus suppress or reduce gelation of a lithium intercalation compound having high residual alkali ($Li_2CO_3$, LiOH) as a core and also improve material stability, thereby improving thermal safety.

The stabilizer may be acetic acid, acetylacetone, oxalic acid, citric acid, or a combination thereof.

The lithium-containing compound may be lithium acetate, lithium nitrate, lithium hydroxide, lithium carbonate, lithium acetate, a hydrate thereof, or a combination thereof. The aluminum compound may be aluminum nitrate, aluminum hydroxide, aluminum acetate, a hydrate thereof, or a combination thereof. The M-containing compound may be an M-containing nitrate, an M-containing hydroxide, an M-containing carbonate, an M-containing acetate, a hydrate thereof, or a combination thereof.

The phosphate salt may be $NH_4H_2PO_4$, $(NH_4)_2HPO_4$, $Li_3PO_4$, or a combination thereof, and the solvent may be water, ethanol, isopropyl alcohol, acetone, ethylene glycol, butanol, or a combination thereof.

In the mixing process, the lithium-containing compound, the aluminum-containing compound, the M-containing compound, and the phosphate salt may be used (e.g., added or included) in an appropriate or suitable molar ratio to obtain the solid electrolyte compound represented by Chemical Formula 1.

In the mixing process, the stabilizer may be used in an amount of about 0.01 parts by weight to about 5 parts by weight based on 100 parts by weight of the lithium-containing compound. When the stabilizer is used in an amount of less than about 0.01 parts by weight, the effects of using the stabilizer may not be obtained (e.g., may not be measurable). When the stabilizer is used in an amount of more than about 5 parts by weight, battery performance metrics (such as high rate capability, cycle-life characteristics, and/or the like) may be deteriorated or decreased by the resulting positive active material.

A lithium intercalation compound may be added to the mixed solution to thereby prepare a mixture. The ratio (e.g., relative amounts) of the mixed solution and the lithium intercalation compound may be adjusted so that about 0.1 wt % to about 10 wt % of a coating compound is included in 100 wt % of a final positive active material.

The obtained mixture may be dried and sintered to manufacture a positive active material.

The drying process may be performed at a temperature of room temperature to about 250° C. for about 0.5 hour to about 48 hours. As used herein, room temperature may be about 20° C. to about 25° C.

The sintering process may be performed at about 700° C. to about 1000° C. for about 1 hour to about 48 hours. During the sintering process, the stabilizer may be removed, and the lithium intercalation compound, (for example, a coating compound including $Li_2MO_3$ and the solid electrolyte compound represented by Chemical Formula 1, wherein M is an element selected from Ti, Cr, Ga, Fe, Sc, In, Y, La, Mg, Sr, and combinations thereof) may be formed on the surface of the core.

In some embodiments, the $Li_2MO_3$ included in the coating compound may diffuse into and be included in the core during the sintering process.

When the sintering process is performed within these temperature and time ranges, a uniform (e.g., substantially uniform) and stable NASICON compound having no residual organic material such as carbon, (e.g., the solid electrolyte compound represented by Chemical Formula 1) may be well-formed on the surface of the core.

The process may generate almost no or substantially low amounts of undesired byproducts, for example, $Li_3PO_4$, $TiO_2$, $LiTiOPO_4$, $TiP_2O_7$, and/or the like, and may thus prevent or reduce problems of ion conductivity deterioration and/or the like.

Another example embodiment of the present disclosure provides a rechargeable lithium battery including a positive electrode including the positive active material; a negative electrode including a negative active material; and an electrolyte.

The positive electrode may include a positive current collector and a positive active material layer formed on the positive current collector. The positive active material may be the positive active material according to an embodiment of the present disclosure.

In the positive active material layer, the positive active material may be included in an amount of about 90 wt % to about 98 wt % based on the total amount of the positive active material layer.

The positive active material layer may include a binder and a conductive material. Herein, the binder and conductive material may each be included in an amount of about 1 wt % to about 5 wt % based on the total amount of the positive active material layer.

The binder may improve the binding properties of the positive active material particles with one another and with a current collector. Non-limiting examples of the binder may include polyvinyl alcohol, carboxyl methyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but embodiments of the present disclosure are not limited thereto.

The conductive material may be included to provide or increase electrode conductivity. Any suitable electrically conductive material may be used as a conductive material unless it causes a chemical change or reaction in the rechargeable lithium battery. Non-limiting examples of the conductive material may include a carbon-based material such as natural graphite, artificial graphite, carbon black (e.g., acetylene black, Ketjenblack®, and/or Denka Black), a carbon fiber and/or the like; a metal-based material of a metal powder or fiber including copper, nickel, aluminum, silver, and/or the like; a conductive polymer (such as a polyphenylene derivative); and/or mixtures thereof.

The current collector may be Al, but embodiments of the present disclosure are not limited thereto.

The negative electrode may include a current collector and a negative active material layer formed on the current collector, and the negative active material layer may include a negative active material.

The negative active material may include a material that reversibly intercalates/deintercalates lithium ions, a lithium metal, a lithium metal alloy, a material capable of doping/dedoping lithium, and/or a transition metal oxide.

The material that can reversibly intercalate/deintercalate lithium ions may include a carbon material. The carbon material may be any suitable carbon-based negative active material available in the related art for a lithium ion rechargeable battery. Non-limiting examples of the carbon material may include crystalline carbon, amorphous carbon, and mixtures thereof. The crystalline carbon may be non-shaped (e.g., may have no consistent habit or shape), or may be sheet, flake, spherical, or fiber shaped natural graphite and/or artificial graphite. The amorphous carbon may be a soft carbon, a hard carbon, a mesophase pitch carbonization product, fired coke, and/or the like.

Non-limiting examples of the lithium metal alloy may include lithium and an element selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may include silicon (Si), a Si—C composite, $SiO_x$ (0<x<2), a Si-Q alloy (wherein Q is an element selected from an alkali metal, an alkaline earth metal, a Group 13 element, a Group 14 element excluding Si, a Group 15 element, a Group 16 element, a transition element, a rare earth element, and combinations thereof), Sn, $SnO_2$, a Sn—R alloy (wherein R is an element selected from an alkali metal, an alkaline earth metal, a Group 13 element, a Group 14 element excluding Sn, a Group 15 element, a Group 16 element, a transition element, a rare earth element, and combinations thereof), and/or the like. At least one selected from these materials may be mixed with $SiO_2$. The elements Q and R may be selected from Mg, Ca, Sr, Ba, Ra, Sc, Y, Ti, zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), Sn, In, thallium (Tl), Ge, phosphorus (P), arsenic (As), Sb, bismuth (Bi), sulfur (S), selenium (Se), tellurium (Te), polonium (Po), and combinations thereof.

The transition metal oxide may include vanadium oxide, lithium vanadium oxide, and/or the like.

In the negative active material layer, the negative active material may be included in an amount of about 95 wt % to about 99 wt % based on the total weight of the negative active material layer.

The negative active material layer may include a binder, and optionally a conductive material. The negative active material layer may include about 1 to about 5 wt % of a binder based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of the negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, a polyurethane, polytetrafluoroethylene, polyvinylidene fluoride, polyethylene, polypropylene, a polyamide-imide, a polyimide, or a combination thereof.

The water-soluble binder may include a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity (e.g., increase the viscosity of the mixture for coating the negative active material). The cellulose-based compound may include one or more of carboxylmethyl cellulose, hydroxypropyl methyl cellulose, methyl cellulose, or alkali metal salts thereof. The alkali metal in the alkali metal salt may be Na, K, or Li. The cellulose-based compound may be included in an amount of about 0.1 parts by weight to about 3 parts by weight based on 100 parts by weight of the negative active material.

The conductive material may be included to provide or increase electrode conductivity. Any suitable electrically conductive material may be used as a conductive material unless it causes a chemical change or reaction in the rechargeable lithium battery. Non-limiting examples of the conductive material may include a carbon-based material (such as natural graphite, artificial graphite, carbon black, acetylene black, Ketjenblack®, a carbon fiber, and/or the like); a metal-based material of a metal powder or fiber including copper, nickel, aluminum, silver, and/or the like; a conductive polymer (such as a polyphenylene derivative); or a mixture thereof.

The current collector may include one selected from a copper foil, a nickel foil, a stainless steel foil, a titanium foil, a nickel foam, a copper foam, a polymer substrate coated with a conductive metal, and combinations thereof, but embodiments of the present disclosure are not limited thereto.

The negative electrode and the positive electrode may each be manufactured by mixing an active material, a conductive material, and a binder in a solvent to prepare an active material composition, and coating the composition on a current collector. Suitable electrode manufacturing methods are well known, and are thus not described in more detail in the present specification. When the negative electrode uses a non-water-soluble binder, the solvent may be an organic solvent such as N-methylpyrrolidone. When the negative electrode uses a water-soluble binder, the solvent may be water.

The electrolyte may include an organic solvent and a lithium salt.

The organic solvent may serve as a medium of transmitting the ions taking part in electrochemical reactions of the battery.

The organic solvent may include a carbonate-based, ester-based, ether-based, ketone-based, alcohol-based, or aprotic solvent. Non-limiting examples of the carbonate-based solvent may include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), and/or the like. Non-limiting examples of the ester-based solvent may include methyl acetate, ethyl acetate, n-propyl acetate, dimethyl acetate, methyl propionate, ethyl propionate, y-butyrolactone, decanolide, valerolactone, mevalonolactone, caprolactone, and/or the like. Non-limiting examples of the ether-based solvent may include dibutyl ether, tetraglyme, diglyme, dimethoxyethane, 2-methyltetrahydrofuran, tetrahydrofuran, and/or the like, and non-limiting examples of the ketone-based solvent may include cyclohexanone and/or the like. Non-limiting examples of the alcohol-based solvent may include ethyl alcohol, isopropyl alcohol, and/or the like, and non-limiting examples of the aprotic solvent may include nitriles (such as R—CN, where R is a $C_2$ to $C_{20}$ linear, branched, or cyclic hydrocarbon and may include a double bond, an aromatic ring, and/or an ether bond), amides (such as dimethylformamide), dioxolanes (such as 1,3-dioxolane), sulfolanes, and/or the like.

The organic solvent may be used alone or in a mixture. When the organic solvent is used in a mixture, the mixture ratio may be controlled (e.g., selected) in accordance with suitable or desirable battery performance.

The carbonate-based solvent may include a mixture of a cyclic carbonate and a linear carbonate. The cyclic carbonate and linear carbonate may be mixed together in a volumetric ratio of about 1:1 to about 1:9. When the mixture is used as an electrolyte, it may have enhanced performance.

The organic solvent may further include an aromatic hydrocarbon-based solvent in addition to the carbonate-based solvent. The carbonate-based solvent and aromatic hydrocarbon-based solvent may be mixed together in a volumetric ratio of about 1:1 to about 30:1.

The aromatic hydrocarbon-based organic solvent may be an aromatic hydrocarbon-based compound represented by Chemical Formula 2:

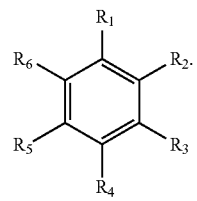

[Chemical Formula 2]

In Chemical Formula 2, $R_1$ to $R_6$ may be the same or different, and may each independently be selected from a hydrogen atom, a halogen atom, a $C_1$ to $C_{10}$ alkyl group, a haloalkyl group, and combinations thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The electrolyte may further include vinylene carbonate, an ethylene carbonate-based compound represented by Chemical Formula 3, or propane sultone as an additive to improve cycle life:

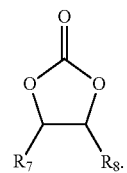

[Chemical Formula 3]

In Chemical Formula 3, $R_7$ and $R_8$ may be the same or different and may each independently be a hydrogen atom, a halogen atom, a cyano group (CN), a nitro group ($NO_2$), or a $C_1$ to $C_5$ fluoroalkyl group, provided that at least one selected from $R_7$ and $R_8$ is a halogen atom, a cyano group (CN), a nitro group ($NO_2$), or a $C_1$ to $C_5$ fluoroalkyl group, and $R_7$ and $R_8$ are not both (e.g., simultaneously) a hydrogen atom.

Non-limiting examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, vinyl ethylene carbonate, fluoroethylene carbonate, and/or the like. The amount of the additive for improving cycle life may be flexibly used within an appropriate or suitable range.

In some embodiments, the electrolyte may further include a nitrile-based additive in order to improve high temperature cycle-life characteristics. The nitrile-based additive may be or include succinonitrile, glutaronitrile, adiponitrile, pimelonitrile, suberonitrile, or a combination thereof. The amount of the nitrile-based additive may be appropriately or suitably controlled so as to improve high temperature cycle-life characteristics without deteriorating other battery characteristics, but embodiments of the present disclosure are not limited thereto.

The electrolyte may further include an additive such as hexane tricyanide.

The lithium salt may be dissolved in an organic solvent to thereby supply a battery with lithium ions, thus basically enabling operation of the rechargeable lithium battery, and to improve transport of the lithium ions between the positive and negative electrodes. Non-limiting examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g. integers selected from 1 to 20), LiCl, LiI, and $LiB(C_2O_4)_2$ (lithium bis(oxalato) borate; LiBOB). The lithium salt may be used at a concentration of about 0.1 M to about 2.0 M. When the lithium salt is included in the above concentration range, an electrolyte may have excellent performance and lithium ion mobility due to optimal electrolyte conductivity and viscosity.

The rechargeable lithium battery may further include a separator between the negative electrode and the positive electrode, depending on the type or kind of battery. Non-limiting examples of a suitable separator material may include polyethylene, polypropylene, polyvinylidene fluoride, and multi-layered separators thereof (such as a polyethylene/polypropylene double-layered separator, a polyethylene/polypropylene/polyethylene triple-layered separator, and a polypropylene/polyethylene/polypropylene triple-layered separator).

The rechargeable lithium battery may be classified as a lithium ion battery, a lithium ion polymer battery, or a lithium polymer battery depending on the type or kind of separator and electrolyte. It also may be classified as a cylindrical, prismatic, coin-type (e.g., coin), pouch-type (e.g., pouch), and/or the like depending on shape. The rechargeable lithium battery may also be classified as a bulk type or thin film type (e.g., bulk battery or thin film battery), depending on its size. Structures and manufacturing methods for lithium ion batteries pertaining to this disclosure are available in the related art.

FIG. 1 is a schematic view showing a structure of a rechargeable lithium battery according to an embodiment of the present disclosure. Referring to FIG. 1, a rechargeable lithium battery 100 according to an embodiment of the present disclosure includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

Hereinafter, examples of the present disclosure and comparative examples are described. These examples, however, are not in any sense to be interpreted as limiting the scope of the present disclosure.

EXAMPLE 1

Lithium nitrate ($LiNO_3$, Aldrich), aluminum nitrate nonahydrate ($Al(NO_3)_3 \cdot 9H_2O$, Aldrich), titanium butoxide (Ti$(OtBu)_4$), Aldrich), ammonium phosphate monobasic ($NH_4H_2PO_4$, Aldrich), acetic acid ($CH_3COOH$), and acetylacetone ($CH_3COCH_2COCH_3$) were dissolved in a mixed solvent of water and ethanol to prepare a mixed solution (a coating compound precursor solution).

The mixed solution was mixed with $LiCoO_2$ to prepare a mixture (e.g., suspension), and this mixture was dried at 120° C. to obtain a dry product. The mixing ratio (e.g., relative amounts) of the mixed solution and the $LiCoO_2$ were adjusted so that a coating compound was included in an amount of 0.25 wt % based on 100 wt % of the positive active material.

The dry product was sintered at 900° C. for 9 hours to manufacture a positive active material including a $LiCoO_2$ core and a coating compound including $Li_{1.3+4x}Al_{0.3}Ti_{1.7-x}(PO_4)_3$ (x=0.1) and $Li_2TiO_3$ as a later on the surface of the core. Herein, the coating compound was used in an amount of 0.25 wt % based on 100 wt % of the positive active material.

EXAMPLE 2

A positive active material was manufactured according to substantially the same method as described with respect to Example 1 except for performing the sintering at 850° C. instead of 900° C. for 9 hours.

EXAMPLE 3

A positive active material was manufactured according to substantially the same method as described with respect to Example 1 except for performing the sintering at 800° C. instead of 900° C. for 9 hours.

EXAMPLE 4

A positive active material was manufactured according to substantially the same method as described with respect to Example 1 except for adjusting a mixing ratio (e.g., relative amounts) between the mixed solution and the $LiCoO_2$, so that the coating compound was included in an amount of 0.5 wt % based on 100 wt % of the positive active material.

EXAMPLE 5

A positive active material was manufactured according to substantially the same method as described with respect to Example 1 except for adjusting a mixing ratio between the mixed solution and the $LiCoO_2$, so that the coating compound was included in an amount of 0.6 wt % based on 100 wt % of the positive active material.

EXAMPLE 6

A positive active material was manufactured according to substantially the same method as described with respect to Example 1 except for adjusting a mixing ratio between the mixed solution and the $LiCoO_2$, so that the coating compound was included in an amount of 0.75 wt % based on 100 wt % of the positive active material.

EXAMPLE 7

A positive active material was manufactured according to substantially the same method as described with respect to Example 1 except for adjusting a mixing ratio between the mixed solution and the $LiCoO_2$, so that the coating compound was included in an amount of 0.8 wt % based on 100 wt % of the positive active material.

EXAMPLE 8

A positive active material was manufactured according to substantially the same method as described with respect to Example 1 except for adjusting a mixing ratio between the mixed solution and the LiCoO$_2$, so that the coating compound was included in an amount of 1 wt % based on 100 wt % of the positive active material.

EXAMPLE 9

A positive active material was manufactured according to substantially the same method as described with respect to Example 1 except for adjusting a mixing ratio between the mixed solution and the LiCoO$_2$, so that the coating compound was included in an amount of 1.2 wt % based on 100 wt % of the positive active material.

EXAMPLE 10

A positive active material was manufactured according to substantially the same method as described with respect to Example 1 except for performing the sintering at 800° C. instead of 900° C. for 9 hours.

COMPARATIVE EXAMPLE 1

A mixed solution was prepared by dissolving lithium nitrate (LiNO$_3$, Aldrich), aluminum nitrate nonahydrate (Al(NO$_3$)$_3$·9H$_2$O, Aldrich), titanium butoxide (Ti(OtBu)$_4$, Aldrich), and ammonium phosphate monobasic (NH$_4$H$_2$PO$_4$, Aldrich) in a mixed solvent of water and ethanol.

The mixed solution and the LiCoO$_2$ were mixed, and this mixture was dried at 120° C. to obtain a dry product. The mixing ratio (e.g., relative amounts) of the mixed solution and the LiCoO$_2$ were adjusted so that a coating compound was 1.2 wt % based on 100 wt % of a positive active material.

The dried product was sintered at 950° C. for 9 hours to manufacture a positive active material having a LiCoO$_2$ core and a coating compound including Li$_{1.3+4x}$Al$_{0.3}$Ti$_{1.7-x}$(PO$_4$)$_3$ (x=0) and Li$_3$PO$_4$ as a layer on the surface of the core. In the positive active material, the coating compound was included in an amount of 1.2 wt % based on 100 wt % of the positive active material.

COMPARATIVE EXAMPLE 2

A positive active material was manufactured according to substantially the same method as described with respect to Comparative Example 1 except for performing the sintering at 820° C. instead of 950° C. for 9 hours.

COMPARATIVE EXAMPLE 3

LiCoO$_2$ was used as a positive active material.

The composition and amount of each of the coating compounds used in Examples 1 to 8, the composition and amount of each core, and each sintering temperature are provided in Table 1, and the composition and amount of each of the coating compounds according to Comparative Examples 1 to 2, the composition and amount of each core, and each sintering temperature are provided in Table 2.

TABLE 1

| | Amount of coating compound (Li$_{1.3+4x}$Al$_{0.3}$Ti$_{1.7-x}$(PO$_4$)$_3$ (x = 0.1) and Li$_2$TiO$_3$) (wt %) | Sintering temperature (° C.) |
|---|---|---|
| Example 1 | 0.25 | 900 |
| Example 2 | 0.25 | 850 |
| Example 3 | 0.25 | 800 |
| Example 4 | 0.5 | 900 |
| Example 5 | 0.6 | 900 |
| Example 6 | 0.75 | 900 |
| Example 7 | 0.8 | 900 |
| Example 8 | 1.0 | 900 |
| Example 9 | 1.2 | 900 |
| Example 10 | 1.0 | 800 |

TABLE 2

| | Amount of coating compound (Li$_{1.3+4x}$Al$_{0.3}$Ti$_{1.7-x}$(PO$_4$)$_3$ (x = 0.1) and Li$_3$PO$_4$) (wt %) | Sintering temperature (° C.) |
|---|---|---|
| Comparative Example 1 | 1.2 | 950 |
| Comparative Example 2 | 1.2 | 820 |

XRD Measurement and Rietveld Refinement

The mixed solutions (coating compound precursor solutions) according to Examples 1 and 3 and Comparative Examples 1 and 2 were each dried at 120° C. and sintered at 900° C. for 9 hours to prepare each compound.

X-ray Diffraction (XRD) spectra of the compounds were measured and analyzed by Rietveld refinement. The XRD Rietveld refinement results for Example 1 and Comparative Example 1 are provided in Tables 3 and 4, respectively, and the Rietveld-XRD results for Example 3 and Comparative Example 2 are provided in Tables 5 and 6, respectively.

TABLE 3

| Crystal phase | Amount (wt %) |
|---|---|
| Li$_{1.3+4x}$Al$_{0.3}$Ti$_{1.7-x}$(PO$_4$)$_3$ (x = 0.1) | 99.44 |
| Li$_3$PO$_4$ | 0.00 |
| TiO$_2$, rutile | 0.14 |
| AlPO$_4$ | 0.35 |
| Li$_2$TiO$_3$ | 0.07 |
| Total | 100 |

TABLE 4

| Crystal phase | Amount (wt %) |
|---|---|
| Li$_{1.3+4x}$Al$_{0.3}$Ti$_{1.7-x}$(PO$_4$)$_3$ (x = 0) | 19.75 |
| Li$_3$PO$_4$ | 0.66 |
| TiO$_2$, rutile | 0.48 |
| AlPO$_4$ | 75.47 |
| LiTiOPO$_4$ | 2.41 |
| TiP$_2$O$_7$ | 1.23 |
| Total | 100 |

TABLE 5

| Crystal phase | Amount (wt %) |
|---|---|
| Li$_{1.3+4x}$Al$_{0.3}$Ti$_{1.7-x}$(PO$_4$)$_3$ (x = 0.1) | 99.40 |
| Li$_3$PO$_4$ | 0.00 |

TABLE 5-continued

| Crystal phase | Amount (wt %) |
|---|---|
| $TiO_2$, rutile | 0.08 |
| $AlPO_4$ | 0.25 |
| $Li_2TiO_3$ | 0.27 |
| Total | 100 |

TABLE 6

| Crystal phase | Amount (wt %) |
|---|---|
| $Li_{1.3+4x}Al_{0.3}Ti_{1.7-x}(PO_4)_3$ (x = 0) | 13.87 |
| $Li_3PO_4$ | 0.38 |
| $TiO_2$, rutile | 0.42 |
| $AlPO_4$ | 81.71 |
| $LiTiOPO_4$ | 0.59 |
| $TiP_2O_7$ | 3.03 |
| Total | 100 |

As shown in Tables 3 and 5, the coating compounds in Examples 1 and 3 showed no detectable formation of $Li_3PO_4$ which might deteriorate performance, but included some $Li_2TiO_3$. On the other hand, as shown in Tables 4 and 6, the coating compounds according to Comparative Examples 1 and 2 included $Li_3PO_4$ and were expected to exhibit deteriorating performance, but included no detectable $Li_2TiO_3$.

SEM Images

Figure 2:
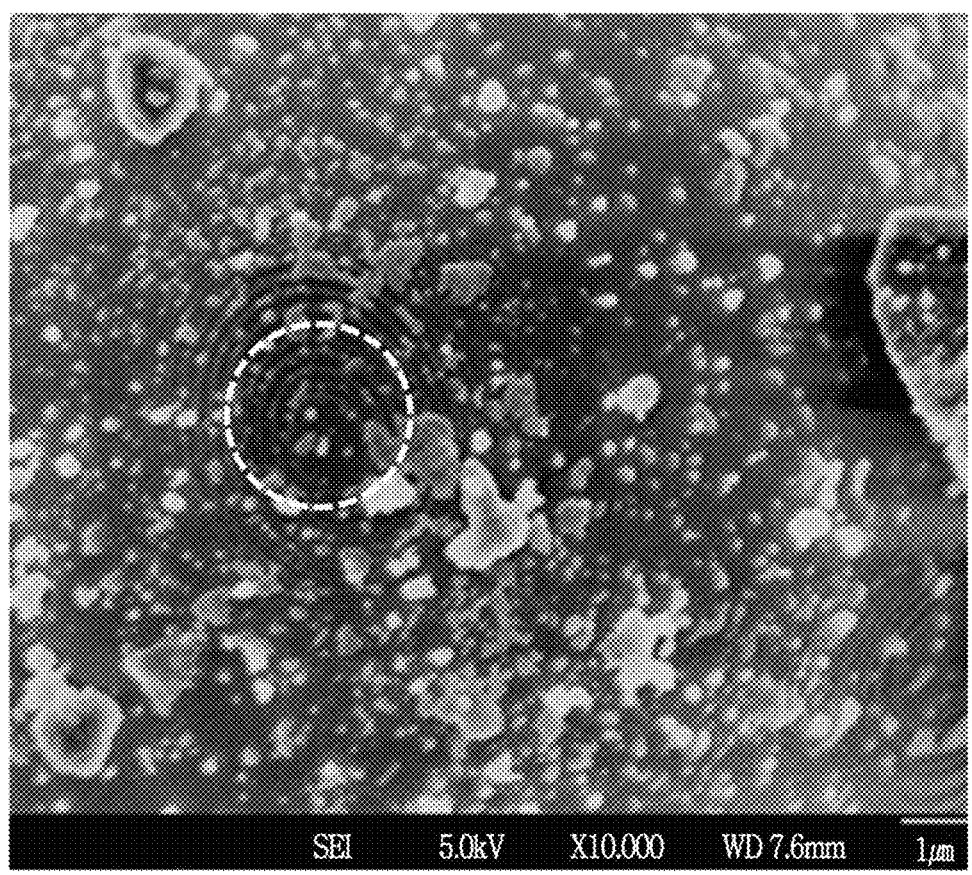
FIG. 2 is a SEM image showing the surface of a dry product (e.g., positive active material prior to sintering) according to Comparative Example 1.
Figure 3:
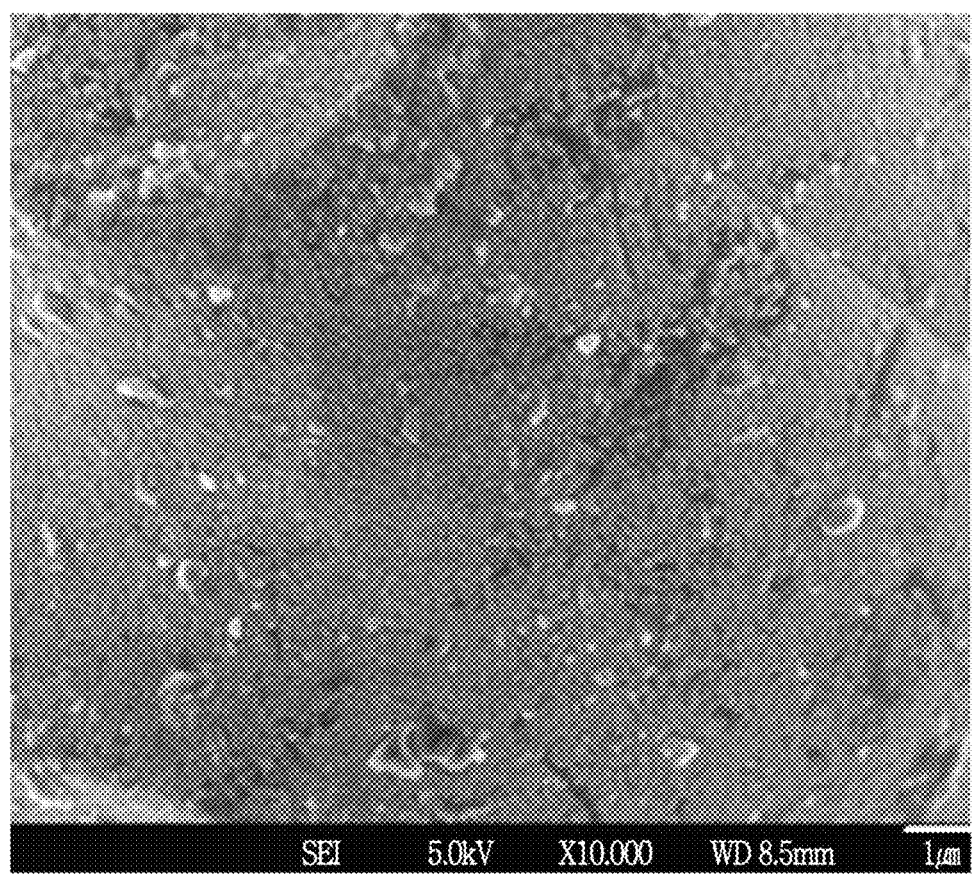
FIG. 3 is a SEM image showing the surface of a dry product (e.g., positive active material prior to sintering) according to Example 8.

FIG. 2 is a SEM image showing the surface of the dry product according to Comparative Example 1. FIG. 3 is a SEM image showing the surface of the dry product according to Example 8. As shown in FIG. 2, the dry product according to Comparative Example 1 showed a ring pattern (some of which are highlighted by the circle of broken lines) characteristic of the layered structure on the surface of $LiCoO_2$ (e.g., characteristic of the core material), but referring to FIG. 3, the dry product according to Example 8 showed a uniform and dense coating layer formed of small particles (e.g., uniformly distributed small particles), and thus the ring pattern of the layered $LiCoO_2$ core was not observed.

This result shows that the positive active material according to Example 8 included a coating compound uniformly (e.g., substantially) covering the surface of a core despite being applied in a small amount. Accordingly, the dry product of Example 8 had a coating compound on the surface and thus might effectively suppress or reduce unwanted reactions occurring during direct contact of the core material with an electrolyte solution.

Figure 4:
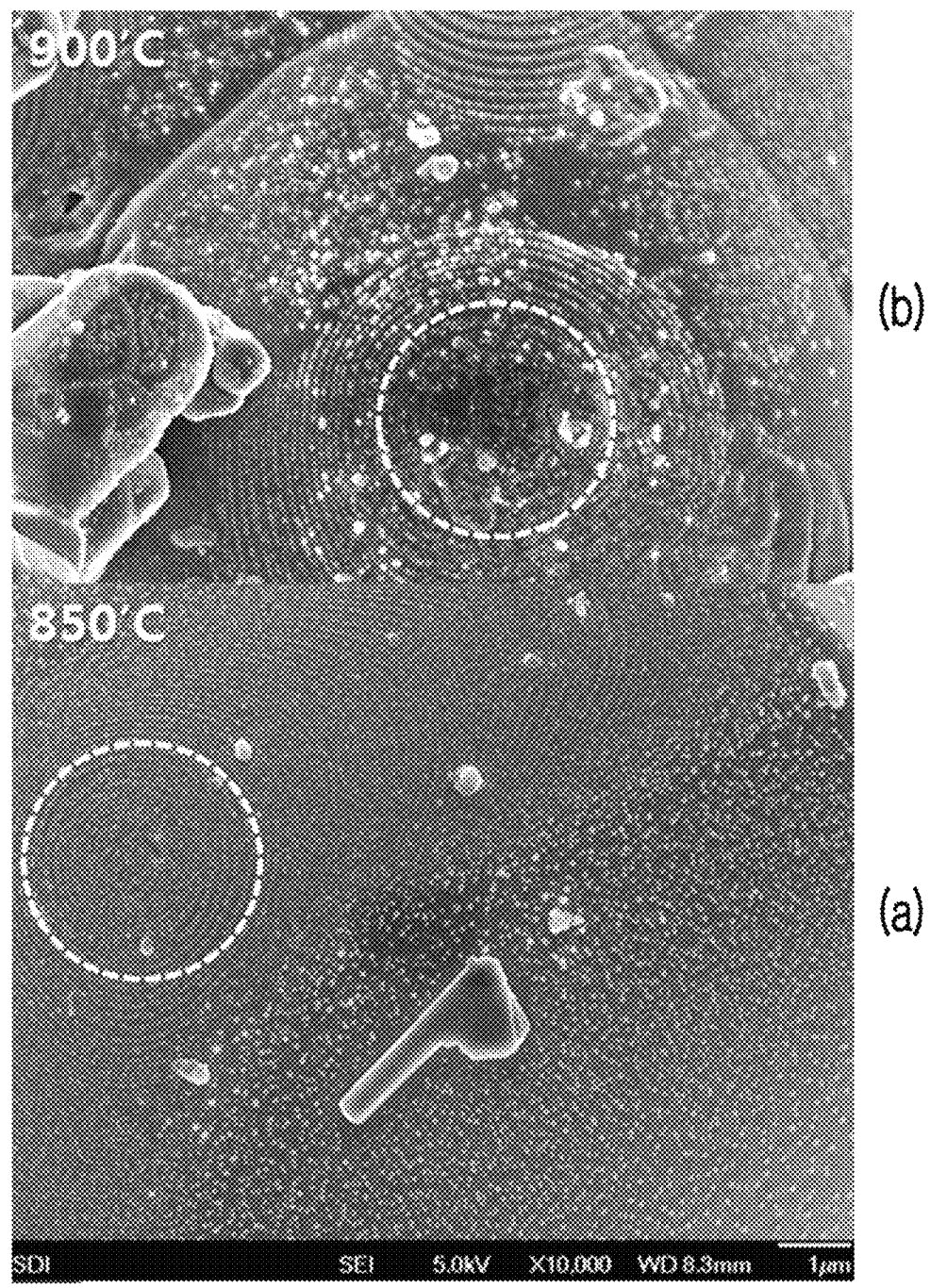
FIG. 4 is a set of SEM images showing the surfaces of the positive active materials according to Examples 1 and 2, respectively (a: Example 2 (850° C.), b: Example 1 (900° C.)).

FIG. 4 is a SEM image showing the surfaces of the positive active materials according to Examples 1 and 2 (a: Example 2 at 850° C., b: Example 1 at 900° C.). The studded ring pattern (some of which are highlighted by the circle of broken lines) visible in (a) of FIG. 4 shows that small particulates were coated on the surface of the core particle (e.g., a uniform or substantially uniform and thin coating layer was formed), and is different from the ring pattern seen in FIG. 2.

Furthermore, the highlighted region (e.g., the region highlighted by the circle of broken lines) in (b) of FIG. 4 more clearly shows that small particles were coated in the ring pattern, and that as the sintering temperature was increased, the active material particles attained a larger size, and the studded ring pattern became clearer (e.g., more visible).

Accordingly, the $LiCoO_2$ core material was effectively suppressed (e.g. protected) from exposure to outside and thus from formation of a side reaction layer due to a reaction with an electrolyte solution, and the cycle-life characteristics of a rechargeable lithium battery including this positive active material were expected to be improved.

Figure 5:
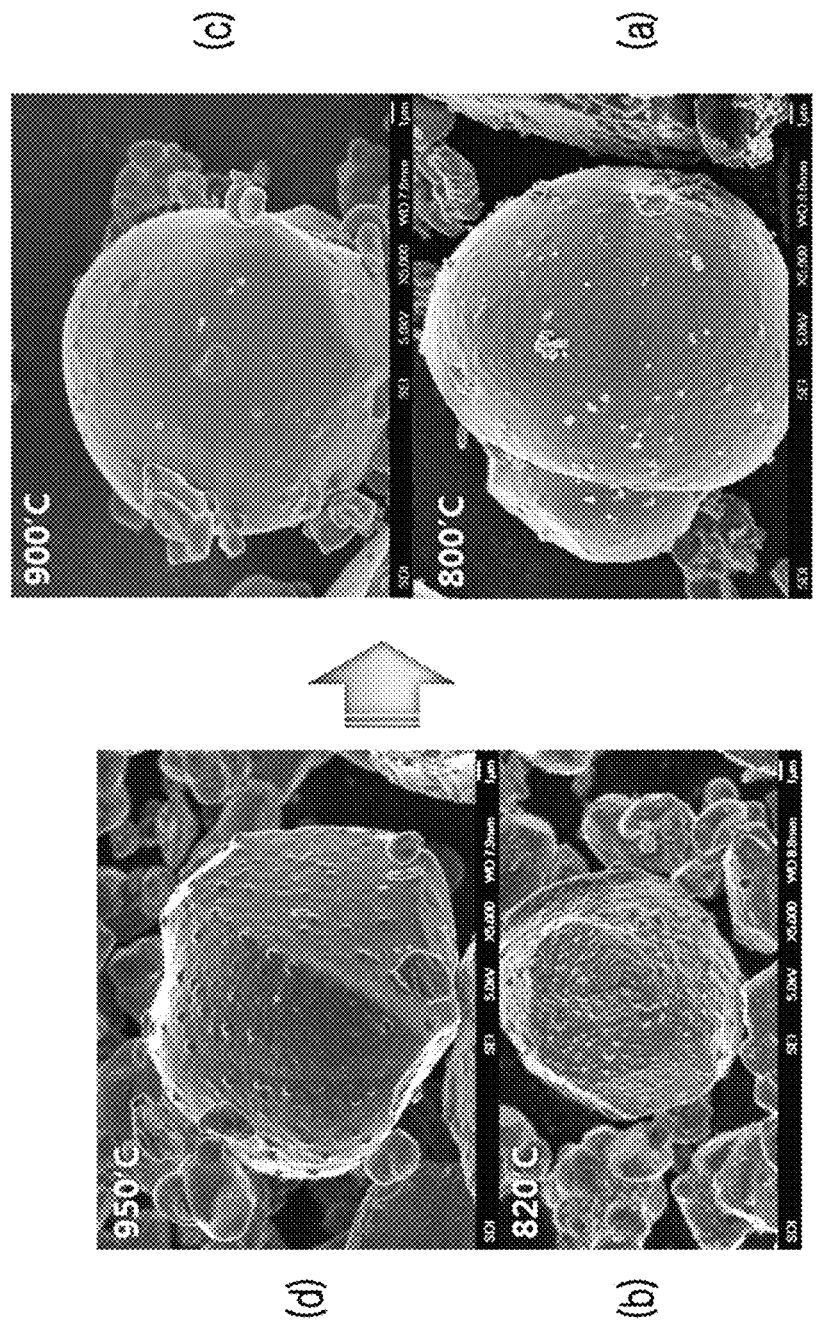
FIG. 5 is a set of SEM images showing the surfaces of positive active materials according to Examples 8 and 10 and Comparative Examples 1 and 2, respectively (a: Example 10 (800° C.), b: Comparative Example 2 (820° C.), c: Example 8 (900° C.), d: Comparative Example 1 (950° C.)).

FIG. 5 is a set of SEM images showing the surfaces of the positive active materials according to Examples 8 and 10 and Comparative Examples 1 and 2 (a: Example 10 (800° C.), b: Comparative Example 2 (820° C.), c: Example 8 (900° C.), d: Comparative Example 1 (950° C.)). Referring to FIG. 5, the positive active materials according to Comparative Examples 2 (b) and 1 (d) included a coating compound formed thick on the surface as an island shape (e.g., were thickly coated to form island shapes or nubs), while the positive active materials manufactured using a stabilizer according to Examples 10 (a) and 8 (c) included a coating compound formed as a uniform layer including island particles (e.g. were coated in a uniform or substantially uniform layer).

Figure 6:
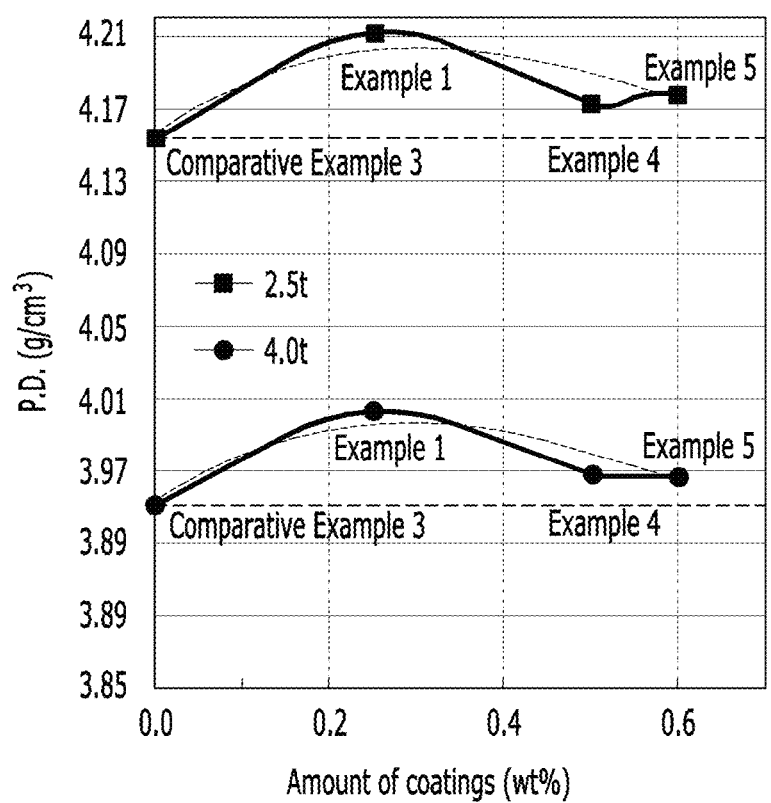
FIG. 6 is a graph showing the pellet densities of the positive active materials according to Examples 1, 4, and 5 and Comparative Example 3.

Evaluation of Powder Pellet Density Depending on Coating Amount 3.0 g of each positive active material according to Examples 1, 4, and 5 and Comparative Example 3 was put in a mold and pressed at room temperature (e.g., 25° C.) at a pressure of 2.5 tons or 4 tons for 30 seconds to manufacture a powder pellet including only the active material. The density of each powder pellet was measured, and the results are shown in FIG. 6. As shown in FIG. 6, the positive active materials including the coating compound in an amount of 0.25 wt % to 0.6 wt % according to Examples 1, 4, and 5 showed improved pellet density compared with the positive active material including no coating compound according to Comparative Example 3.

EXAMPLE 11

96 wt % of the positive active material according to Example 8, 2 wt % of a polyvinylidene fluoride binder, and 2 wt % of a Denka Black conductive material were mixed in N-methyl pyrrolidone, thereby preparing a positive active material slurry.

The positive active material slurry was coated on an Al foil substrate, dried, and compressed to manufacture a positive electrode.

The positive electrode was used with a lithium metal counter electrode and an electrolyte solution to manufacture a half-cell. The electrolyte solution was prepared by mixing ethylene carbonate, ethyl methyl carbonate, and dimethyl carbonate in a volume ratio of 3:3:4 to obtain an organic solvent and dissolving 1.15 M $LiPF_6$ (a lithium salt) therein.

COMPARATIVE EXAMPLES 4 AND 5

96 wt % of each positive active material according to Comparative Examples 1 and 2, 2 wt % of a polyvinylidene fluoride binder, and 2 wt % of a Denka Black conductive material were mixed in N-methyl pyrrolidone, thereby preparing two positive active material slurries.

Each positive active material slurry was coated on a separate Al foil, and then dried and compressed to manufacture a positive electrode.

Each positive electrode was used with a lithium metal counter electrode and an electrolyte solution to manufacture a half-cell through a suitable process. Herein, the electrolyte solution was prepared by mixing ethylene carbonate, ethyl methyl carbonate and dimethyl carbonate in a volume ratio of 3:3:4 and dissolving 1.15 M LiPF$_6$ (a lithium salt) therein.

Evaluation of Rate Capability

Each half-cell according to Example 11 and Comparative Example 4 was charged and discharged one time each at 0.1 C and a temperature of 25° C. The charge capacities and discharge capacities were measured, and the results are provided in Table 7. In addition, each half-cell was charged and discharged one cycle each at 0.1 C, 0.2 C, 0.5 C, 1 C, and 2 C. The charge capacities at each rate were measured, and the results are provided in Table 7 and FIG. 7.

Figure 8:
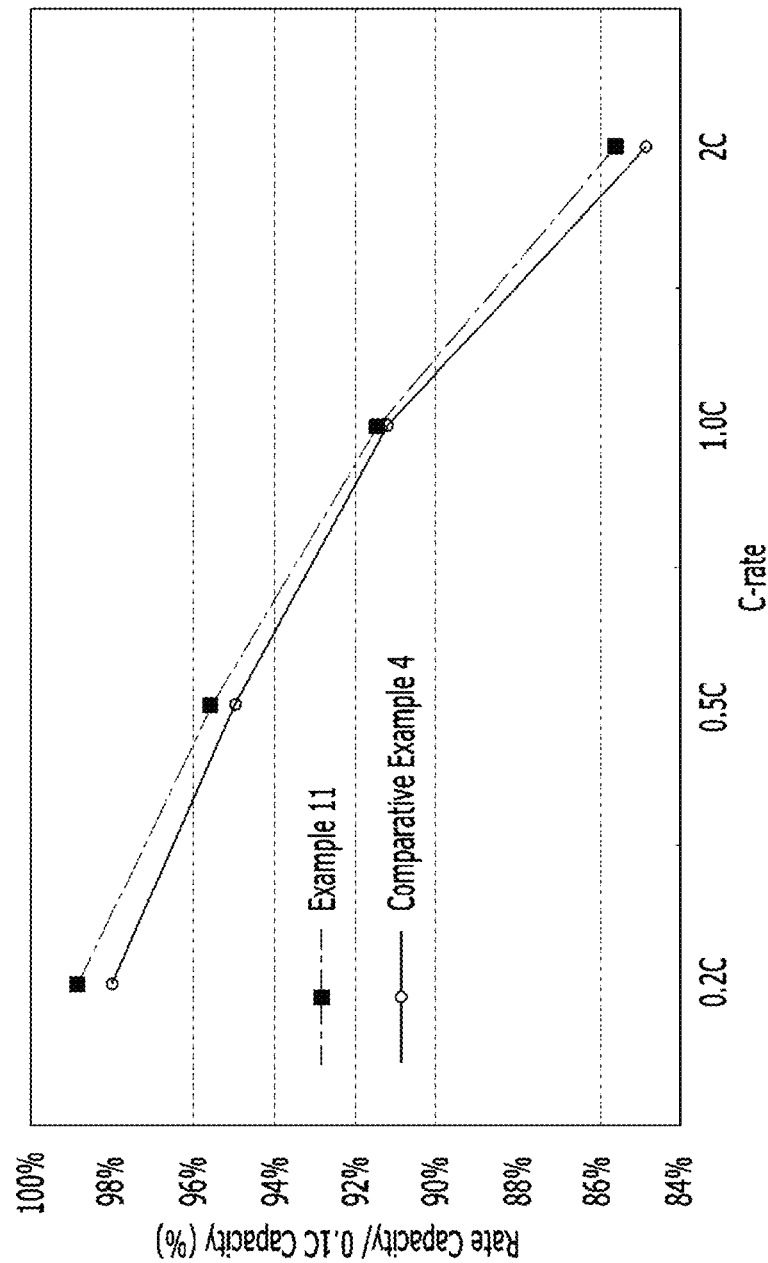
FIG. 8 is a graph showing the rate capacities of each half-cell according to Example 11 and Comparative Example 4 at C-rates between 0.2 C to 2 C, relative to the rate capacity at 0.1 C.

In addition, the charge capacity ratios (%) at 0.1 C relative to 1 C and 2 C relative to 1 C are provided in Table 7, while the charge capacity ratios (%) at 0.5 C, 1.0 C, and 2.0 C relative to 0.1 C are provided in FIG. 8.

TABLE 7

|  | Charge capacity (mAh/g) | Discharge capacity (mAh/g) | 0.2 C (mAh/g) | 0.5 C (mAh/g) | 1 C (mAh/g) | 2 C (mAh/g) | 0.1 C charge capacity ratio (%) | 2 C charge capacity ratio (%) |
|---|---|---|---|---|---|---|---|---|
| Example 11 | 195.78 | 191.61 | 189.45 | 183.19 | 175.32 | 164.08 | 97.9 | 85.6 |
| Comparative Example 4 | 196.40 | 189.50 | 185.80 | 180.00 | 172.80 | 160.80 | 98.0 | 84.9 |

Figure 7:
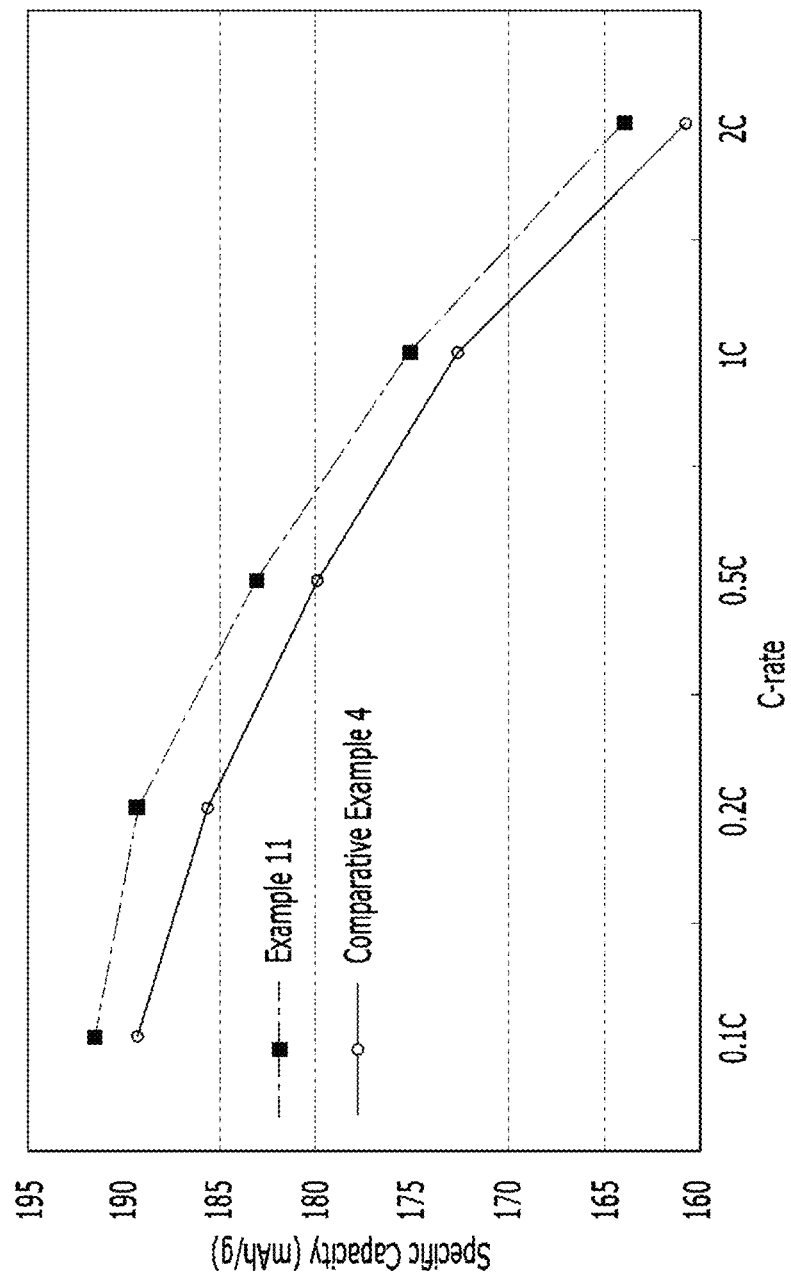
FIG. 7 is a graph showing the specific capacities (mAh/g) of each half-cell according to Example 11 and Comparative Example 4 at C-rates between 0.1 C to 2 C.

As shown in Table 7 and FIGS. 7 and 8, the battery half-cell of Example 11 showed excellent rate capability compared with that of Comparative Example 4.

The half-cells according to Example 11 and Comparative Example 4 were charged and discharged once at 0.1 C and a temperature of 45° C. Their charge capacities and discharge capacities were measured, and the charge and discharge efficiency results are provided in Table 8.

TABLE 8

|  | Charge capacity (mAh/g) | Discharge capacity (mAh/g) | Charge and discharge efficiency (%) |
|---|---|---|---|
| Example 11 | 197.66 | 193.71 | 98.0 |
| Comparative Example 4 | 197.29 | 190.19 | 96.4 |

As shown in Table 8, the battery half-cell of Example 11 showed excellent charge and discharge capacity and charge and discharge efficiency compared with that of Comparative Example 4.

Room Temperature (25° C.) Cycle-Life Characteristics

The battery half-cells according to Example 11 and Comparative Example 4 were charged and discharged over 65 cycles using a constant current/constant voltage charge at 1.0 C and room temperature under a cut-off condition of 4.5 V and 0.05 C and a constant current discharge at 1.0 C under a cut-off condition of 3.0 V. The discharge capacities during cycles 1 to 65 were measured, and the results are provided in FIG. 9. In addition, the ratio of the discharge capacity after each cycle relative to the first discharge capacity (e.g., the discharge efficiency) is provided in FIG. 10.

As shown in FIGS. 9 and 10, the battery half-cell of Example 11 using the positive active material of Example 8 showed very excellent room temperature cycle-life characteristics compared with the battery half-cell of Comparative Example 4 using the positive active material of Comparative Example 1.

EXAMPLE 12

96 wt % of the positive active material according to Example 8, 2 wt % of polyvinylidene fluoride binder, and 2 wt % of Denka Black conductive material were mixed in N-methyl pyrrolidone, thereby preparing a positive active material slurry.

The positive active material slurry was coated on an Al foil, dried, and compressed to thereby manufacture a positive electrode.

96 wt % of artificial graphite, 2 wt % of polyvinylidene fluoride binder, and 2 wt % of Denka Black conductive material were mixed in N-methyl pyrrolidone, thereby preparing a positive active material slurry.

The negative active material slurry was coated on a Cu foil, dried, and compressed to thereby manufacture a negative electrode.

The positive electrode, the negative electrode, and an electrolyte solution were used in a process suitable to manufacture a rechargeable lithium battery cell having a nominal capacity of 2800 mAh. Herein, the electrolyte solution was prepared by dissolving 0.9 M LiPF$_6$ (a lithium salt) in solvent mixture of ethylene carbonate, diethylcarbonate, and ethyl propionate (3:5:2 volume ratio), adding 0.2 mol of LiBF$_4$ thereto, and then adding 6 parts per volume of fluoroethylene carbonate, 0.5 parts per volume of vinyl ethylene carbonate, 2.5 part per volume of propane sultone, 5 parts per volume of succinonitrile, 1 part per volume of propane sultone, and 1 part per volume of hexane tricyanide based on 100 parts per volume of the mixed organic solvent.

COMPARATIVE EXAMPLE 6

96 wt % of the positive active material according to Comparative Example 1, 2 wt % of polyvinylidene fluoride binder, and 2 wt % of Denka Black conductive material were mixed in N-methyl pyrrolidone, thereby preparing a positive active material slurry.

The positive active material slurry was coated on an Al foil, dried, and compressed to manufacture a positive electrode.

A negative active material slurry was prepared by mixing 96 wt % of artificial graphite, 2 wt % of polyvinylidene fluoride binder, and 2 wt % of Denka Black conductive material in N-methyl pyrrolidone.

The negative active material slurry was coated on a Cu foil, dried, and compressed to thereby manufacture a negative electrode.

The positive electrode, the negative electrode, and an electrolyte solution were used in a process to suitable manufacture a rechargeable lithium battery cell having a nominal capacity of 2800 mAh. Herein, the electrolyte solution was substantially the same as the one used in Example 11.

Cycle-Life Evaluation at Room Temperature and Thickness Measurement

The two rechargeable lithium battery cells according to Example 12 and Comparative Example 6 were each charged and discharged 500 times at room temperature of 25° C. under the following conditions:

Charge: constant current and constant voltage charge at 1.0 C under a cut-off condition of 4.4 V and 0.1 C, Discharge: constant current discharge at 1.0 C under a cut-off condition of 3.0 V, Single charge at every 50$^{th}$ cycle: constant current and constant voltage charge at 0.2 C under a cut-off condition of 4.4 V and 0.02 C, Single discharge at every 50$^{th}$ cycle: constant current discharge at 0.2 C under a cut-off condition of 2.75 V.

Figure 11A:
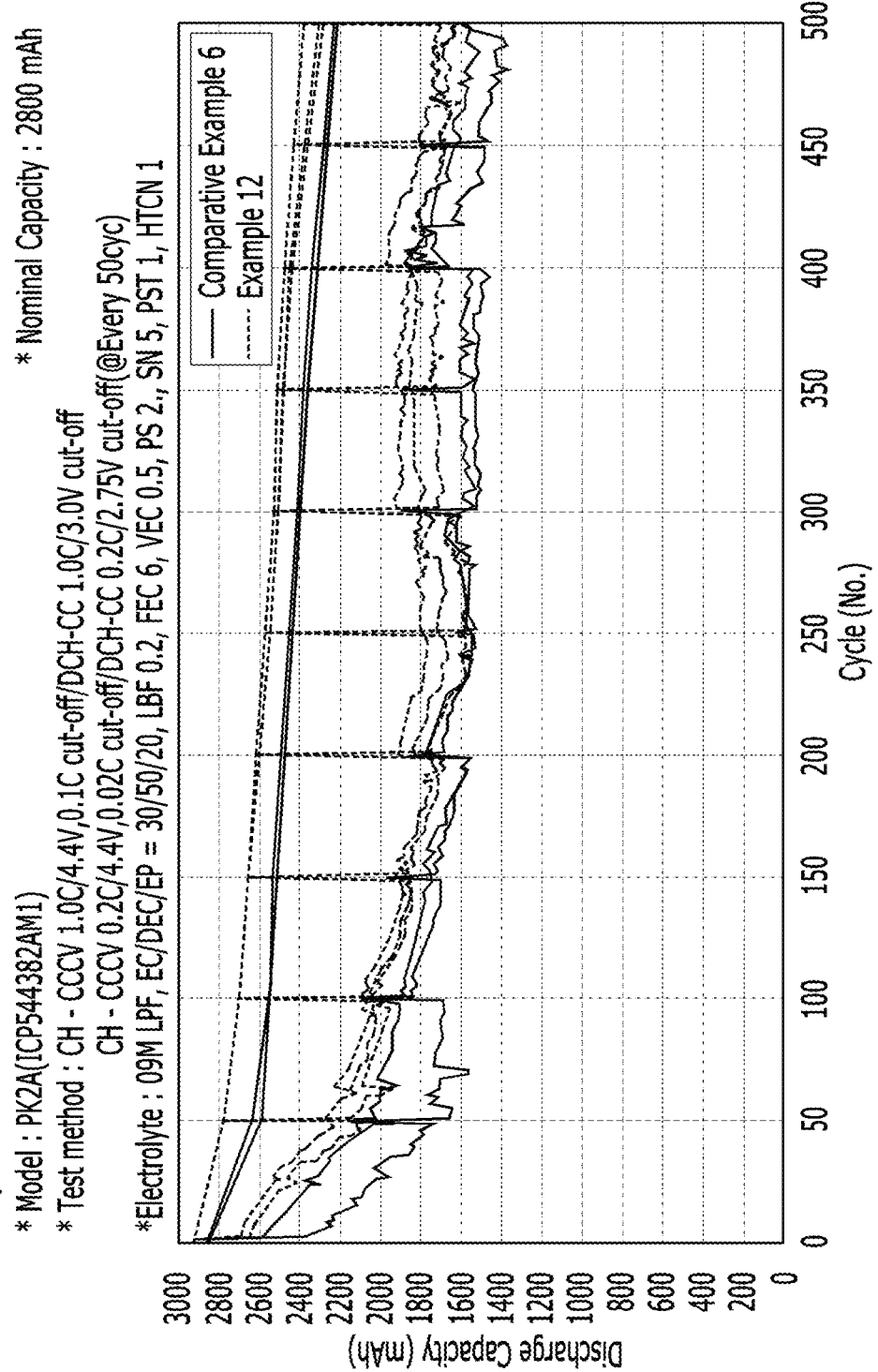
FIG. 11A is a graph showing the discharge capacities of the rechargeable lithium battery cells according to Example 12 and Comparative Example 6 over 500 cycles at room temperature.

The discharge capacity at each cycle was measured, and the results thereof are provided in FIG. 11A. In FIG. 11A, the dotted line indicates the capacity at 0.2 C.

As shown in FIG. 11A, the rechargeable lithium battery cells of Example 12 showed excellent cycle-life characteristics compared with the rechargeable lithium battery cells of Comparative Example 6.

Figure 11B:
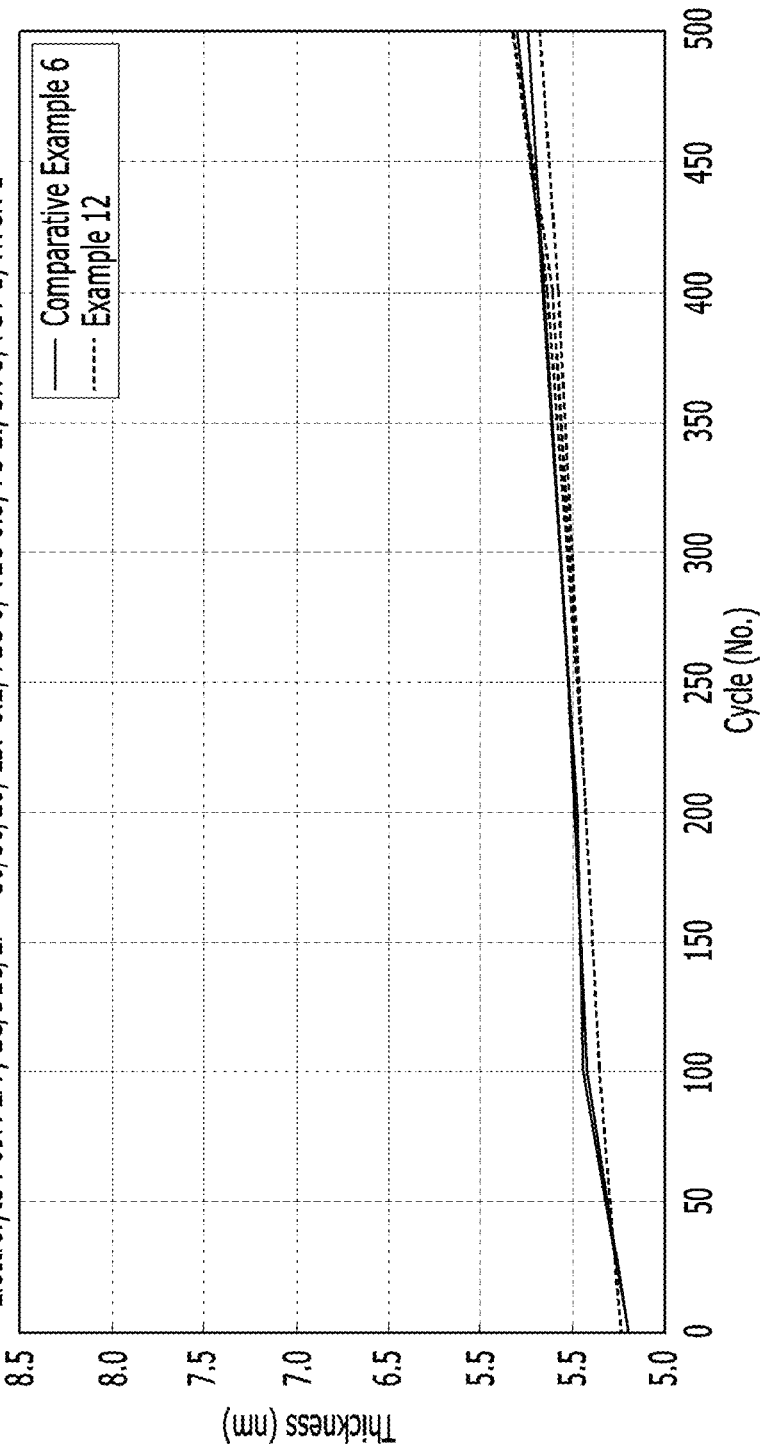
FIG. 11B is a graph showing thickness changes of the rechargeable lithium battery cells according to Example 12 and Comparative Example 6 over 500 cycles at room temperature.

The battery thicknesses at the end of each charge/discharge cycle were measured, and the results are shown in FIG. 11B. As shown in FIG. 11B, the rechargeable lithium battery cells of Example 12 showed excellent cycle-life characteristics (e.g., in terms of battery expansion) compared with the rechargeable lithium battery cells of Comparative Example 6.

In addition, the discharge capacity shown in FIG. 11A was used to calculate a discharge capacity retention ratio (%) based on nominal capacity (2800 mAh) at the end of each cycle, and the results are provided in FIG. 12A. The battery thickness results shown in FIG. 11B were used to calculate a thickness increase rate (%) at the end of each cycle relative to the battery thickness after the first charge and discharge, and the results are provided in FIG. 12B.

As shown in FIGS. 11A, 11B, 12A, and 12B, the battery cells of Example 12 showed excellent cycle-life characteristics and a small thickness increase compared with the battery cells of Comparative Example 6.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the example embodiments described herein should be considered in a descriptive sense only and not for purposes of limitation. Therefore, the aforementioned embodiments should be understood to be examples, but not limiting the present disclosure in any way.

While this disclosure has been described in connection with what is presently considered to be practical example embodiments, it is to be understood that the present disclosure is not limited to the disclosed embodiments, but, on the contrary, is intended to cover various modifications and equivalent arrangements within the spirit and scope of present disclosure as defined by the following claims and equivalents thereof.

What is claimed is:

1. A positive active material for a rechargeable lithium battery, comprising:
    a particle core including a lithium intercalation compound, and
    a layer of island particles on the particle core, an island particle of the island particles comprising a coating compound comprising: $Li_2MO_3$; a solid electrolyte represented by Chemical Formula 1; and $AlPO_4$:

$$Li_{1.3+4x}Al_{0.3}M_{1.7-x}(PO_4)_3, \qquad \text{[Chemical Formula 1]}$$

wherein in Chemical Formula 1, 0≤x≤0.7, and
    wherein M is an element selected from Ti, Cr, Ga, Fe, Sc, In, Y, La, Mg, Sr, and combinations thereof,
    the solid electrolyte represented by Chemical Formula 1 is mixed with the $Li_2MO_3$ to a mixing ratio of about 100:0.1 wt % to about 100:3 wt %, and
    an amount of the $AlPO_4$ is 0.25 wt % to 0.35 wt % with respect to 100 wt % of the coating compound.

2. The positive active material of claim 1, wherein the coating compound is present in a layered phase on the surface of the particle core.

3. The positive active material of claim 1, wherein the particle core further comprises $Li_2MO_3$, wherein M is an element selected from Ti, Cr, Ga, Fe, Sc, In, Y, La, Mg, Sr, and combinations thereof.

4. The positive active material of claim 1, wherein an amount of the coating compound is about 0.1 wt % to about 10 wt % based on 100 wt % of the positive active material.

5. The positive active material of claim 1, wherein a specific surface area of the positive active material is about 0.1 m$^2$/g to about 0.3 m$^2$/g.

6. The positive active material of claim 1, wherein the positive active material is prepared by:
    mixing a lithium-containing compound, an aluminum-containing compound, an M-containing compound, a phosphate salt, a stabilizer, and a solvent to prepare a mixed solution;
    adding a lithium intercalation compound to the mixed solution to obtain a mixture; and
    drying and sintering the mixture.

7. The positive active material of claim 6, wherein the stabilizer is acetic acid, acetylacetone, oxalic acid, citric acid, or a combination thereof.

8. A rechargeable lithium battery comprising:
    a positive electrode comprising the positive active material of claim 1;
    a negative electrode comprising a negative active material; and
    an electrolyte.

* * * * *